United States Patent
Hübner et al.

(10) Patent No.: US 7,877,095 B2
(45) Date of Patent: Jan. 25, 2011

(54) METHOD AND DEVICE FOR ADAPTING A RADIO NETWORK MODEL TO THE CONDITIONS OF A REAL RADIO NETWORK

(75) Inventors: Johannes Hübner, Dresden (DE); Dietrich Hunold, Dresden (DE)

(73) Assignee: Actix GmbH, Dresden (DE)

( * ) Notice: Subject to any disclaimer, the term of this patent is extended or adjusted under 35 U.S.C. 154(b) by 660 days.

(21) Appl. No.: 11/486,951

(22) Filed: Jul. 14, 2006

(65) Prior Publication Data

US 2007/0010204 A1    Jan. 11, 2007

Related U.S. Application Data

(63) Continuation of application No. PCT/EP2005/000134, filed on Jan. 10, 2005.

(30) Foreign Application Priority Data

Jan. 15, 2004    (DE) .................. 10 2004 002 145

(51) Int. Cl.
*H04W 40/00*    (2009.01)
(52) U.S. Cl. .................. 455/446; 455/561; 455/456.1; 455/426.1; 455/67.11; 455/67.14
(58) Field of Classification Search .................. 455/446
See application file for complete search history.

(56) References Cited

U.S. PATENT DOCUMENTS

| | | | |
|---|---|---|---|
| 5,561,841 A | * | 10/1996 | Markus ................. 455/446 |
| 6,611,500 B1 | | 8/2003 | Clarkson et al. |
| 2002/0009992 A1 | | 1/2002 | Jensen |
| 2003/0232601 A1 | | 12/2003 | Uno |
| 2004/0116111 A1 | | 6/2004 | Saunders |

FOREIGN PATENT DOCUMENTS

| | | |
|---|---|---|
| WO | WO 93/15591 | 8/1993 |
| WO | WO 0210942 | 2/2002 |
| WO | WO 02/073997 A1 | 9/2002 |

* cited by examiner

*Primary Examiner*—Lester Kincaid
*Assistant Examiner*—Sayed T Zewari
(74) *Attorney, Agent, or Firm*—Lawrence G. Fridman (57) ABSTRACT

A method of adapting a radio network model to conditions of a real radio network consists of the following steps: defining different measuring positions; carrying out measurements of variables at the different measuring positions, thereby generating measured data; providing position-dependent modelling values, using the measured data for the modelling values from the real radio network obtained at the measuring positions; setting a fine grid in a radio cell, defining small area portions, wherein one or more of the modelling values is attributed to each area portion by the radio network model. Mathematical operations are then established for modifying the modelling values of all area portions of the fine grid by adapting the modelling values to the measured data. In this manner, the mathematical operations are for each area portion and directly dependent on the measured data and the position of the respective area portions.

17 Claims, 8 Drawing Sheets

METHOD AND DEVICE FOR ADAPTING A RADIO NETWORK MODEL TO THE CONDITIONS OF A REAL RADIO NETWORK

This is a continuing application of international application PCT/EP2005/000134, filed Jan. 10, 2005 which claims priority of german patent application Ser. No. 10 2004 002 145.7, filed Jan. 15, 2004.

FIELD OF THE INVENTION

The invention relates to a method for adapting a radio network model to the conditions of a real radio network providing position dependent modelling values using measured data for the modelling values from the real radio network obtained at measuring positions. The invention further relates to a device for carrying out such a method.

BACKGROUND OF THE INVENTION

Mobil networks, such as mobile networks for cellular telephones, comprise sending stations which are distributed over the landscape. Each sending station is attributed to one "radio cell", and in turn, a "cell code" is attributed to each radio cell. Certain values relevant for the planning and the function of the radio cell vary across the area of the radio cell, such as, for example, the "path loss data". These characterize the physically based radio propagation fading. The receiving power of an end device, for example a cellular telephone, decreases with increasing distance from the sending station for a given sending power of a sending station emitted in a given direction. This decrease is caused, on one hand, by the distribution of the emitted sending power to a wave front area increasing with the distance similar as it is the case with light. The decrease, however, is also determined by absorption or buildings or the topography of the landscape.

For the planning and optimizing of a radio network radio network models are generated. For this purpose the area of a radio cell is divided into a pattern of relatively small area portions. "Model values" are attributed to each of these area portions. They are the values of a variable relevant for the function of the mobile network valid for this area portion. Such a variable is, in particular, the path losses. It can also be that the sending power is received by a sending station with different intensities and running times at a certain point of a radio cell. An impulse-shaped sending signal is then received in the form of several time-delayed impulses with different height. This is called "impulse response". The values of such a model variable attributed to the individual area portions form a matrix.

In the planning phase, i.e. before installing the radio network, relevant physical values cannot be measured. After the installation of the radio network it is also not possible to measure such physical values, such as the path losses for each individual area portion. Most of the area portions are not accessible without problems. Furthermore, the efforts and expenses for such measurements in each area portion are extremely high. Therefore mathematical models for predicting a radio channel have been developed, modelling the various influencing variables and their influence on, for example, the path losses due to physical rules or empirically found relationships. These models comprise certain parameters.

The channel models obtained in such a way usually do not properly fit to the reality. It is, therefore, necessary to adapt the channel models obtained at first to the reality as well as possible using measured data of real variables. For this purpose the parameters of the channel models in known methods are varied based on measured data. The parameters and terms of the channel models are adapted step-by-step and the values for the path losses repeatedly newly calculated. This method takes a lot of efforts, because it is not known which parameter is responsible in which way of the deviations between the measured values and the model values, i.e. how the parameters must be varied to minimize the deviations between the model and the reality.

An example for this prior art is the publication by D. J. Y Lee and W. C. Y Lee "Fine Tune Lee Model", p. 406-410 IEE Conference on Personal, Indor and Mobile Radio Communications" 18-21 Sep. 2000.

From WO 02/073997 A1 a method for adapting a path loss model to the conditions of a real radio network is known wherein at first a path loss model is obtained at measuring positions from the information about a base station, that is the sending power, emitting pattern and height, topographical information and measured data, i.e. signal strength. The model obtained from physical conditions is supported by real measured data. The measured data influences, as described above, are the parameters of the model. Such a path loss model provides a model value in the form of a path loss value for each point of the considered sending area. Normally, deviations of the path loss values obtained from the model from the real measured data occur. Such deviations occur due to shading. To take such shading into account this shading is statistically evaluated in a further step providing parameters for a shading prediction in the considered area. Thereby a second model is used for the shading, the parameters of which are determined from the deviations of the measured data from the path loss values obtained from the first model. The shading values obtained in such a way are superimposed on the path loss values obtained from the first model. If the measured values are very reliable, the path loss values obtained from these models at the measuring positions can be substituted by real measured data. For smaller reliability of the measured values a weighted average value of the measured data and model values is used instead of the measured values.

The method according to the WO 02/073997 A1 therefore operates with two models in two steps, the parameters of the models being determined using measured data which have been obtained at certain measuring positions. Therefore, this is also the determination of parameters of models as it is the case with the previously mentioned prior art. The substitution of the model values by real measured data is effected, if at all, at the measuring positions themselves.

SUMMARY OF THE INVENTION

It is an object of the invention to adapt a radio network model to the real world conditions in a radio network in a more simple way than in the prior art using measured data.

A method of the invention contains the following steps:
setting a fine grid in a radio cell, defining small area portions, wherein a value of the modelling variable is attributed to each area portion by the radio network model, and
setting mathematical operations for modifying the modelling values of all area portions of the fine grid by adapting the modelling values to the measured data,
wherein the mathematical operations are for each area portion directly dependent on the measured data and the position of the respective area portion.

According to the method of the invention the parameters of a radio network model are not varied, but the modelling values themselves are directly modified. This is effected with the modelling values of all area portions according to a certain mathematical operation. This operation directly depends on the measuring data and the position of the respective area portion.

The method according to the invention can preferably be carried out by the steps:
- setting a rough grid superimposed on the fine grid thereby defining areas which each comprise a plurality of area portions of the fine grid,
- obtaining measured data at measuring positions, and
- modifying the measuring values attributed to the area portions in the different areas by a mathematical operation according to the measured values of an area of the rough grid.

The mathematical operation can comprise an interpolation. The interpolation can be carried out with the following steps:
- summarizing the measured values at the measuring positions of one respective area of the rough grid to one value representing the general value of these measured values,
- setting a reference point within the area of the rough grid to which the value representing the measured values is attributed,
- setting an influence radius around the reference point, and
- varying the modelling values in all area portions within the influence radius according to a decreasing function of the distance of the respective area portion to the reference point.

It is advantageous if the value representing the value of the measured data is an (arithmetic or geometric) average value of the measured data. It may also be a weighted average value.

A preferred application of the method according to the present invention is that the modelling values are modelled path loss data and the measured data are path loss data determined from the receiving power of the reference signals emitted by the radio cell of a radio network.

The modelling values may also be modelled impulse responses in the sense described above. These impulse responses are characterised by several physical variables, i.e. receiving powers or path losses and respective phase or running time differences. These physical variables can be summarised in the form of matrices.

Preferably at first the following steps are carried out:
- Obtaining measured data over the entire radio cell,
- Determining a value representing the values of such measured data,
- Forming of a value representing the values of the modelling values over the entire radio cell,
- Forming the difference of the values representing the values of measured data and modelling data, and
- Correcting the modelling values with this difference.

Preferably the values representing the values of modelling data and measured data are here also average values.

In such a way at first a difference between the entire radio network model and the measured data is removed. The average value of the measured data over the entire radio cell coincides with the average value of the entire modelling values in a radio cell. However, local deviations can and will normally still occur. Such local deviations are compensated in the way as described above.

A device for carrying out the described method with a data base storing a virtual radio network model with position dependent modelling values, a measuring device for the generation of position dependent measured data of the modelled real radio network at measuring positions, is, according to the present invention, characterized by data processing means adapted to modify each of the modelling values directly according to the measured data by a mathematical operation by adapting the modelling values to the measured values.

The measuring device can respond to the receiving power of reference signals emitted by the radio cells. Furthermore the measuring device can be is adapted to detect the code of a radio cell. Preferably, the measuring device is mobile, for example mounted on a measuring carriage driving along the streets in the area of the radio cell. The measuring device can also be the end station of a radio network. Furthermore it is reasonable, if the measuring device comprises means for detecting the respective actual receiving position, for example a receiver for the satellite navigation. Furthermore, means can be provided for recording and outputting the measured values together with the respective code of the radio cell and the position at the time of the measurement.

Due to a radio network model adapted in the described way an optimization of the radio network can be affected, such as the changing of the antenna angle of the sending station.

An embodiment of the invention is described below in greater detail with reference to the accompanying drawings.

DESCRIPTION OF THE PREFERRED EMBODIMENT

Figure 1:
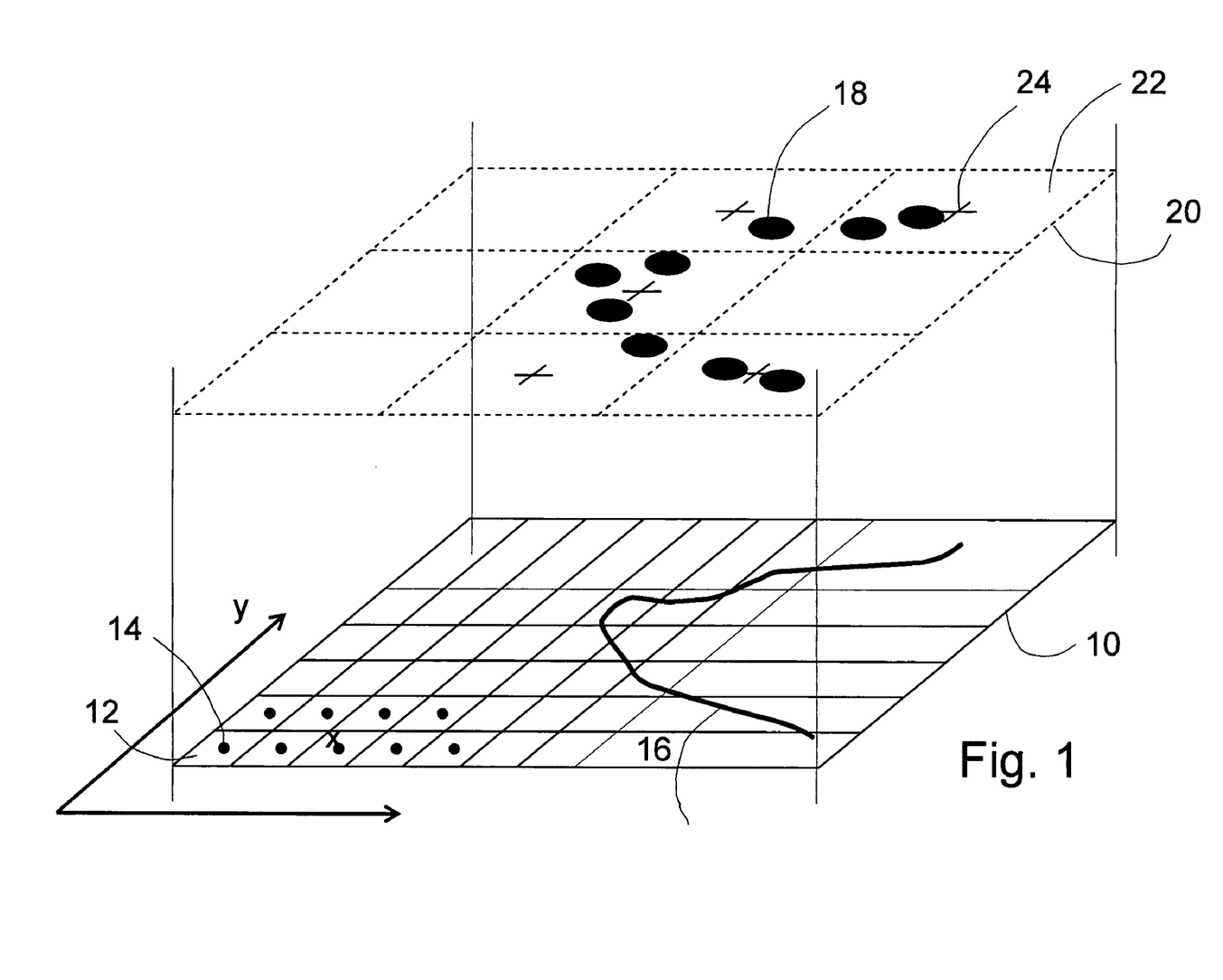
FIG. 1 Is a schematic view for illustrating the method according to the present invention and shows a fine grid and a rough grid in the area of a radio cell, wherein small area portions are determined by the fine grid and larger regions by the rough grid, comprising a plurality of area portions of the fine grid.

In FIG. 1 numeral 10 denotes a fine grid dividing a radio cell of a radio network into a pattern of small area portions 12. A value of a modelling variable is attributed to each area portion 12. These modelling values are, for example, defined by path loss data. Path loss data represent the fading of the sending power emitted by a sending station in the direction of the respective area portion in a radio channel up to the respective area portion 12. The modelling values attributed to the area portion 12 are indicated by points 14. The modelling values are obtained from a channel model. At first, this channel model has been developed in the form of a mathematical model considering the different influences, such as distance, topography of the landscape, buildings and plants etc. also using empirically found relationships. The channel model normally does not yet coincide with the reality. It is adapted to the reality by measurements. Such measurements cannot be carried out for each individual area portion. In FIG. 1 measurements are carried out of the real values of the modelling variable or a physical variable derived from the modelling variable, for example the receiving power obtained from the path loss data along a path 16. This path can be, for example, a street where a measuring vehicle drives along. This leads to position dependent measured data represented by dots 18 in FIG. 1.

Using these measured data 18 which do not cover all area portions a correction is carried out by directly interpolating the modelling values 14. This is effected in the following way:

A rough grid 20 is superimposed on the fine grid 10. The rough grid 20 divides the radio cell into regions 22. Each of these regions 22 comprises a large amount of small area portions 12. In each of these regions 22 a reference point 24 is set. It is useful if the reference points 24 are the centers of the essentially square regions 22.

For the correction of the radio network model the following procedure is carried out:

First, a global correction of a displacement of the modelling values of the entire radio cell is effected. For this purpose the average values of the measured values on one hand and the average values of the modelling values on the other hand are formed for the entire radio cell. The modelling values are all corrected by the difference of these average values.

This step still allows for local deviations between the measured values and the modelling values corrected in such a way. A further local adaptation of the modelling values is effected by interpolation. For this purpose the average measured data are formed for each region 22 of the rough grid 20 where measured data were obtained. The modelling value in the center 24 of such a region is set to a value dependent on this average value. The modelling values of the other area portions 12 of this region are corrected with a function decreasing from this point with increasing distance from a center point.

Figure 2:
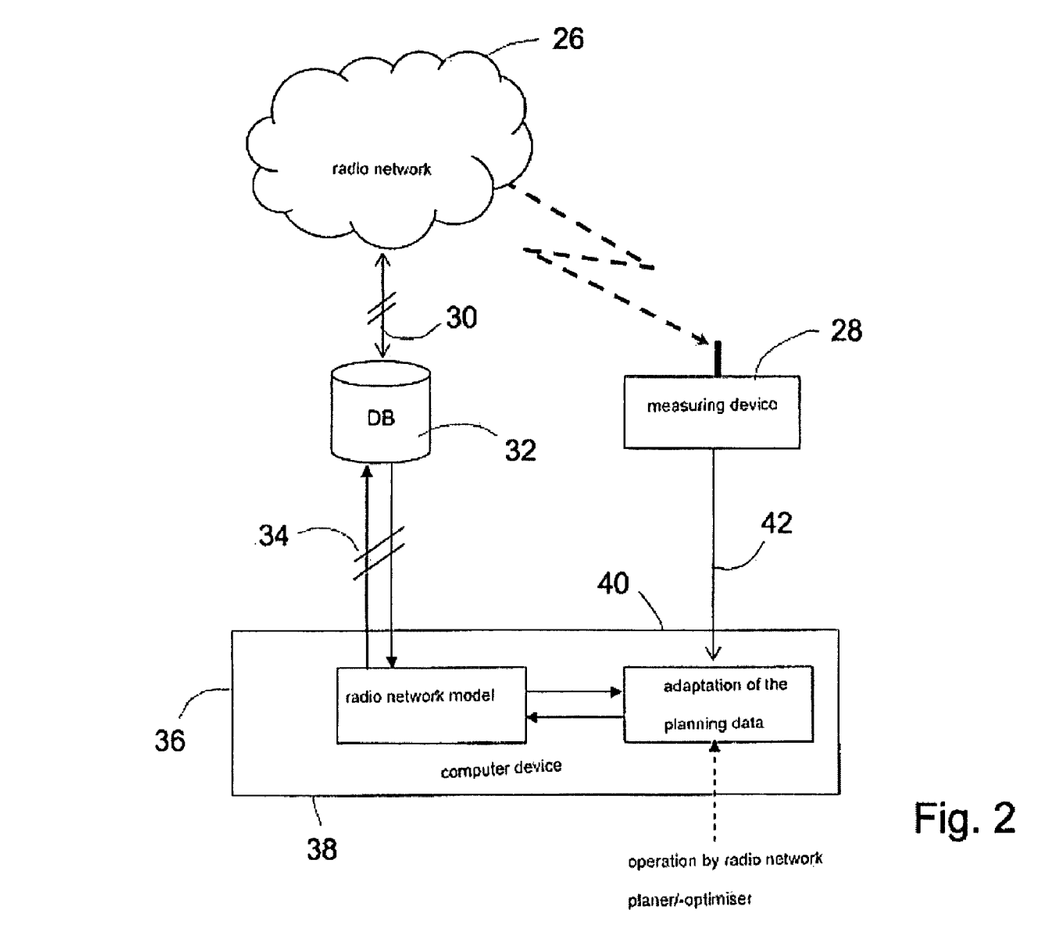
FIG. 2 Is a schematic view of a device for carrying out the method according to the present invention.

A device for carrying out the method is shown in FIG. 2. In FIG. 2 numeral 26 denotes a radio network which is schematically shown. A measuring device 28 receives measured data from the radio network. The measured device 28 is mobile and in this example moves along the path 16 in FIG. 1. The measuring device 28 can be mounted on a measuring vehicle. It may also be an end device of the radio network. The measuring device comprises a device for determining the actual position of the measuring device. This can be a satellite-navigation receiver (for example GPS) or a position finder determining the position of the measuring device by contacting several sending stations.

The radio network comprises several radio cells, which may overlap. Each radio cell is provided with its own code. The measuring device responds to these codes. Thereby the obtained measured data can be attributed to each individual overlapping radio cell.

The measuring device 28 can determine record and output the obtained measured data.

The data of the radio network 26 are stored in a data base 32. There are also the modelling values of the "original", non-corrected radio network model. In FIG. 2 a bidirectional interface between the data base 32 and the radio network 26 is shown. The data base 32 communicates with a computer device 36 through a bidirectional interface 34.

At first the radio network model with modelling values in the form of radio network planning data are stored in the storage 38 in the computer device 36. A computer unit 40 comprises measured data from the measuring device 28. This is indicated by an arrow 42. The computer unit 40 bidirectionally communicates with the storage 38. Therefore, it comprises the modelling values of the radio network model and the measured data. The computer unit carries out the above described mathematical operations, i.e. the correction of the displacement of the modelling values with respect to the measured values and the following local correction. The modelling values corrected in such a way are transferred back and stored in the data base 32 through the interface 34. The computer unit 40 is operated by a person whom is accustomed to the planning of a radio network and its optimization.

Through the interface 30 the data base receives information from the radio network 26 about changes in the radio network or, for example, the amount of not-established connections. These are considered when the radio network is optimized.

Figure 3:
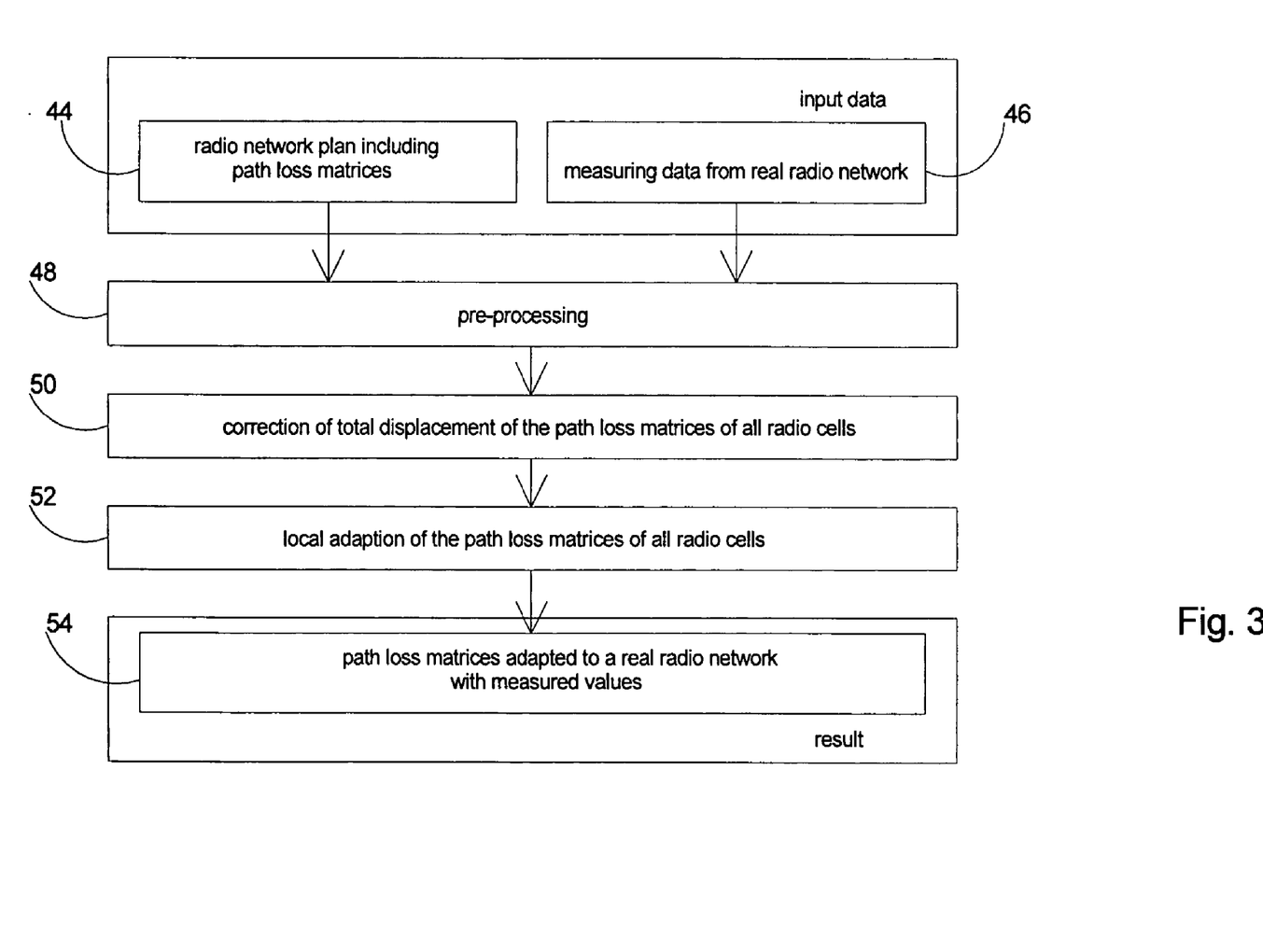
FIG. 3 Is a block diagram and shows the entire procedure of the method according to the present invention.

For a precise carrying out of the method according to the present invention according to FIG. 3 there were radio network planning data 44 for an urban area of about 53 km$^2$ with 66 sending stations of a UMTS-network. Each of the sending stations was provided with one to three cells each with a separate antenna.

In the radio network planning data there were comprised terrain height maps used for the computation of all radio cell path loss matrices according to a relatively rough radio spreading model. Especially the influence of the building structure in the considered area could not be considered with this spreading model, because there were no data available for this purpose. In this respect partly considerable deviations between the path loss prediction data and the measured data recorded for the area were expected for the path losses. A resolution of 25 m×25 m was chosen for the path loss matrices whereby the small area portions of the fine grid mentioned in claim 1 were set.

Furthermore information about the sending station positions, the antennas used in the radio cells together with its direction and further fading factors were comprised in the radio network planning data. The antennas were represented by a suitable three-dimensional model of its antenna diagram. Furthermore the sending power of the reference or pilot signals emitted by the individual radio cells and the also emitted cell codes were stored in the form of scrambling codes in the radio network planning data. Using this information the area distribution of the predicted received power of the pilot signals could be calculated from the path losses given in the matrices also in the form of a matrix. These receiving power matrices have the same grid sectioning as the path loss matrices on which they are based, i.e. in the example 25 m×25 m.

In the real area represented by the present radio network planning data of the UMTS radio network measurements were carried out with a mobile radio measuring device. The measuring device was in the position to measure the receiving power of the pilot signal, as well as to detect which radio cell emitted the respective pilot signal using the corresponding scrambling code. Furthermore the receiving position for each recorded measured value was determined with a GPS-receiver and stored also. During the measurement a series of streets were driven through with the mobile radio measuring device in order to make a sufficient amount of measured values 46 available for the considered area in the form of input values according to FIG. 3. For comparing the measured values to the predicted values of the receiving power of the pilot signals before the adaptation an average value for both of them is computed in a suitable way and afterwards compared at all measuring positions. In the present example an average deviation of more than 13.5 dB with a standard deviation of more than 11 dB was found.

Figure 4:
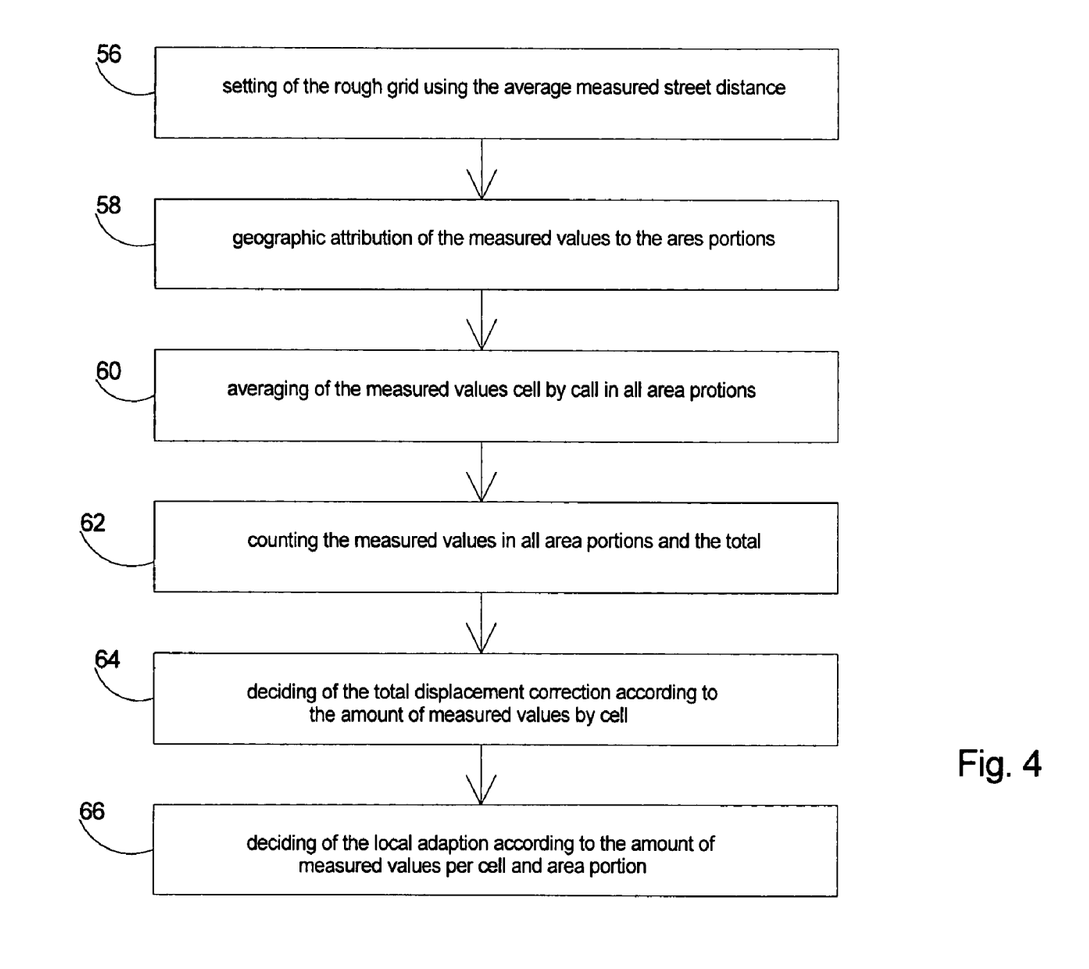
FIG. 4 Is a block diagram and shows the pre-processing according to block 48 in FIG. 3 in detail.

The method according to the present invention was implemented on a computer device so that the adaptation of the path loss matrices could be automatically achieved from the measured values. At first the input data were pre-processed in a step 48. According to FIG. 4 a rough grid with a sectioning of 250 m×250 m was set in a first step 56, the distance of two area portions of this rough grid corresponding to the average distance of two streets for which measured data were present. With this parameterization the measured values were geographically attributed to the respective area portions of the rough grid in step 58 and an average value was formed in step 60 for each cell. Furthermore all values attributed to a certain cell were counted altogether and for each area portion of the rough grid. The cell attribution was established by the respective scrambling code. With the entire amount of measured values per cell it was decided in step 64, if an adaptation of the path loss matrix according to the present invention should be carried out for the respective cell. If there were not enough measured values for a cell, an adaptation was not carried out, because the measured values were not reliable enough. For some radio cells, for example, no measured values were available, because they were switched off during the measuring round and they did not emit. Consequently these cells were not used for the adaptation. Furthermore, in step 66 it was decided for each radio cell and area portion of the rough grid, if there were sufficient measured values for the local adaptation at a later stage. If the amount of measured values for a certain area portion for a certain cell was below a given minimum amount, the respective area portion was not used for the local adaptation.

The real adaptation of the path loss matrices by means of measured values is then carried out in two steps 50 and 52 in FIG. 3.

Figure 5:
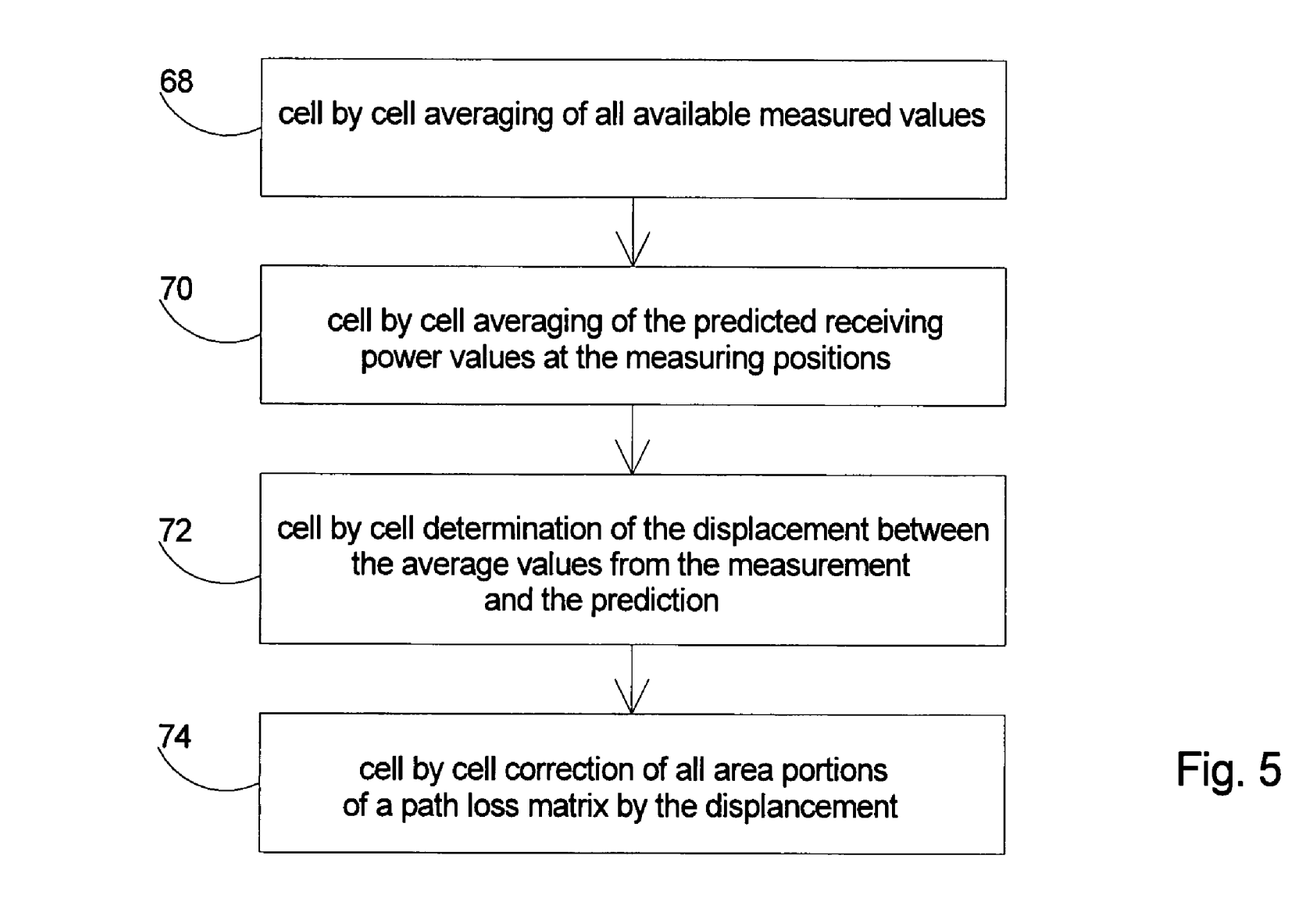
FIG. 5 Is a block diagram and shows the correction of the entire displacement according to block 50 in FIG. 3 in detail.

At first an overall-adaptation of each cell, for which a sufficient amount of measured values was present, was carried out according to the flow chart in FIG. 5. For this purpose all measured values attributed to the respective radio cell by the scrambling code were averaged in a step 68 cell by cell. Furthermore the predicted receiving powers of the pilot signal at the respective measuring position were averaged in a step 70 for each cell and the two average values were compared to each other. The ratio (or in the logarithmic unit decibel it is the difference) of the two average values in step 72 leads to the total displacement of the predicted values with respect to the measured values. The matrix value of all area portions of the fine grid is corrected by this total displacement in a step 74.

Figure 6:
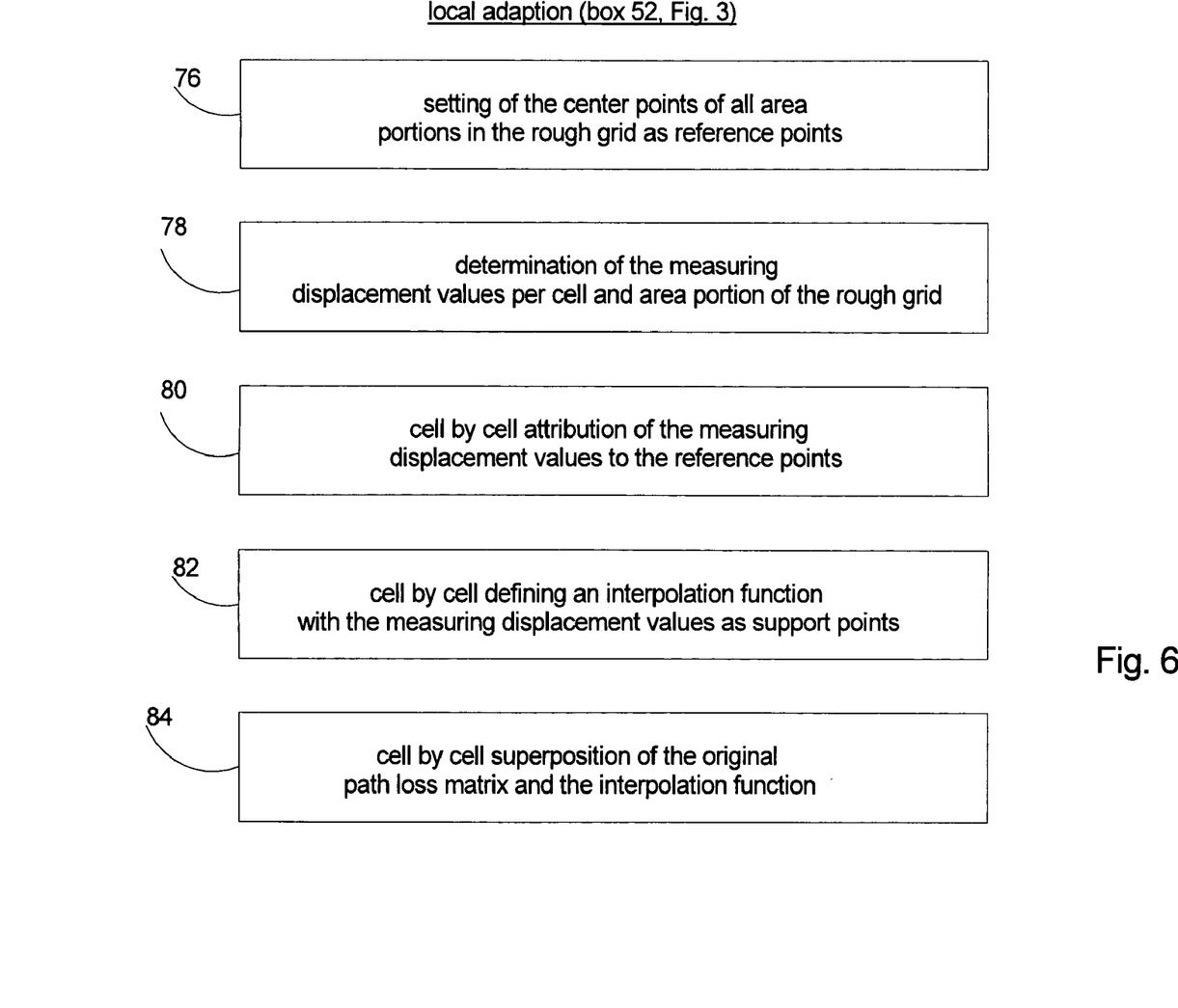
FIG. 6 Is a block diagram and shows the local adaptation according to block 52 in FIG. 3 in detail.
Figure 7:
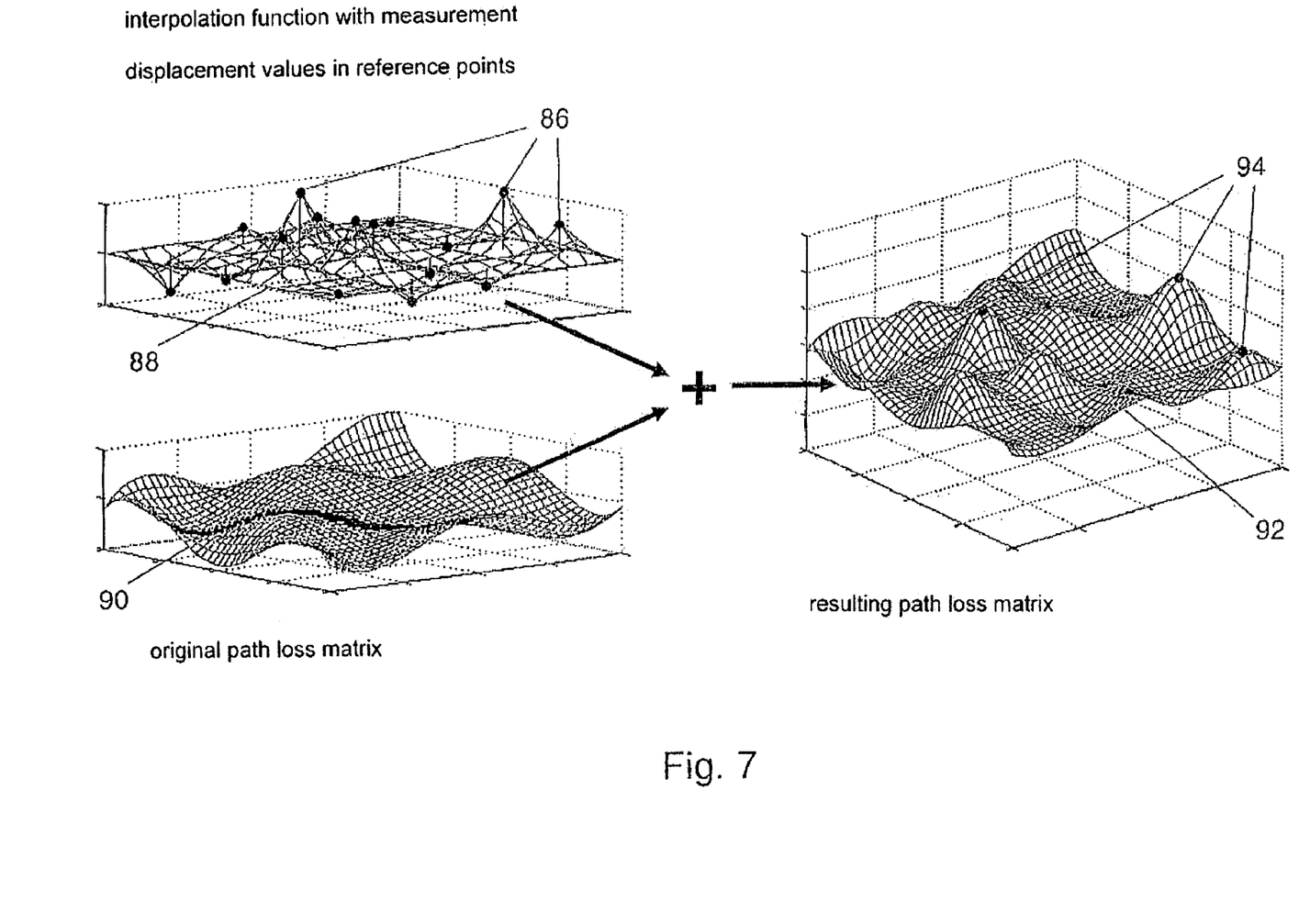
FIG. 7 Is a schematic view and illustrates the correction of a originally present path loss matrix by real measured values.
Figure 8:
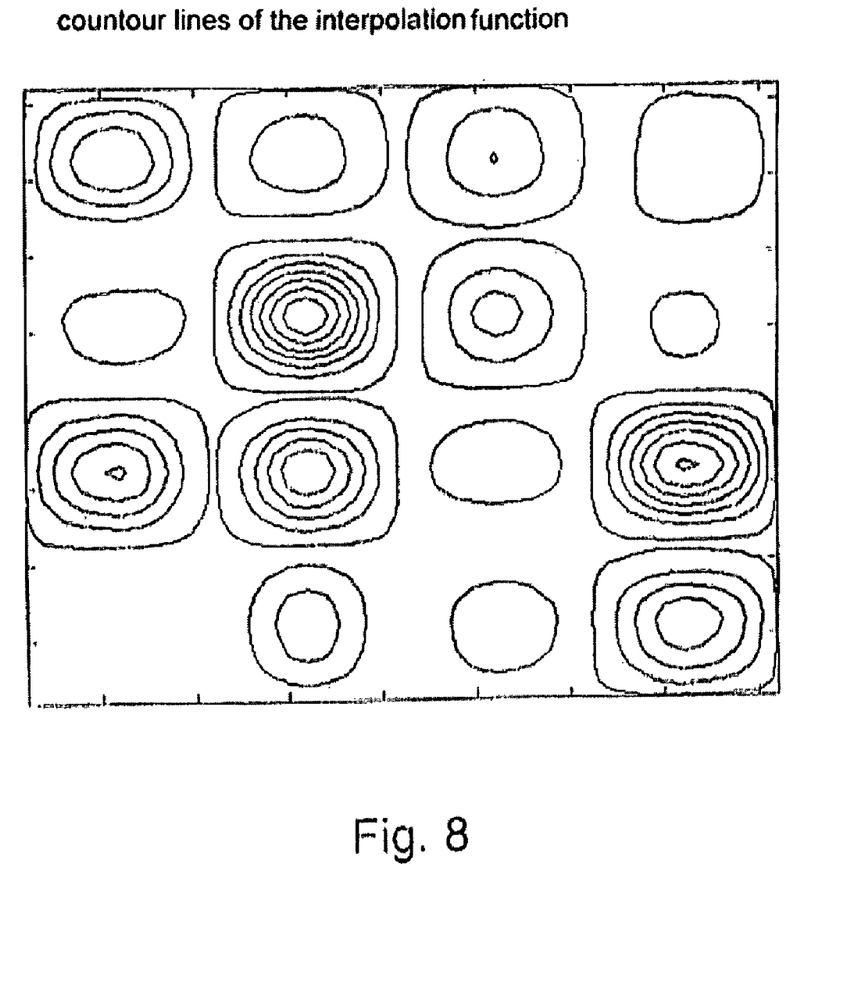
FIG. 8 Is a schematic view and shows the course of the interpolation functions decreasing to all sides from the reference points in the form of contours.

The local adaptation of the path loss matrix is effected in a second step in the flow chart in FIG. 6. For each area portion of the rough grid the respective center point was determined as a reference point in step 76. In step 78 the deviations between the previously averaged measured values and the predicted receiving powers of the pilot signals pre determined for the pilot signals for each radio cell and area portion of the rough grid. These deviations (furthermore called measured value displacements) were attributed to the corresponding reference points cell by cell in step 80. Using the measured value displacements a support positions an interpolation function was formed, where the sections between the support points were filled with a function decreasing with increasing distance. An exemplary interpolation function 88 is shown in FIG. 7 for a random cell, where the measurement displacement values in the support positions are given in the form of dots 86. An influence radius can be defined around each support position for the interpolation function, indicating the influence area of the function decreasing with increasing distance. This influence radius can be, for example, the grid width of the rough grid (i.e. 250 m in the present case). FIG. 8 represents the contour of the exemplary interpolation function 88. The ovals around the support points can be clearly seen, representing the decreasing with increasing distance. After forming the interpolation function it is applied to all small area portions of the original path loss matrix 90 of the respective cell. If both matrices are given in a logarithmic scale this operation is an addition. The result is the adapted path loss matrix 92 which is shown on the right hand side in FIG. 7, comprising the influences of the measured pilot signal receiving power of the respective cell. Compared to the original path loss matrix 90 the effect of the interpolation function can be clearly recognized. The three support values 86 taken by way of example can be found in the form of corresponding increases 94 in the resulting path loss matrix.

This two-step method can be completely carried out for all path loss matrices within only few seconds. After adapting all path loss matrices of all radio cells to the measured values in the described way another comparison of the measured data and the predicted receiving power matrices was carried out. It was found, that the average deviation could be reduced to 1.4 dB with a standard deviation of less than 9 dB.

What is claimed is:

1. A method for adapting a radio network model to conditions of a real radio network comprising the steps of:

defining different measuring positions;

carrying out measurements of variables at said different measuring positions by means of a measuring arrangement adapted for generation of position dependent measured data of the radio network, thereby generating measured data;

providing position-dependent modelling values by a data base adapted for storing at least the radio network model, using said measured data for said modelling values from the real radio network obtained at said measuring positions;

setting by means of a data processing arrangement adapted to modify each modelling a fine grid in a radio cell, so as to define a plurality of small fine grid area portions, wherein at least one said modelling value is attributed to each area portion by said radio network model;

setting with said data processing arrangement a rough grid superimposed on said fine grid thereby defining rough grid regions, each said rough grid region comprises a plurality of said fine grid area portions;

obtaining measured data at said measuring positions with said measuring arrangement; and modifying with said data processing arrangement said modelling values attributed to said fine grid area portions in said different rough grid regions by a mathematical operation comprising an interpolation, which is directly dependent on said measured data of said respective rough grid area portions and said position of said fine grid area portions;

wherein said mathematical operation further comprises:

summarising said measured values at said measuring positions of one of said respective areas of said rough grid to one value representing said general value of said measured values;

setting a reference point within said area of said rough grid to which said value representing said measured values is attributed;

setting an influence radius around said reference point; and varying said modelling values in all area portions within the influence radius according to a decreasing function of the distance of the respective area portion to said reference point.

2. The method according to claim 1, wherein said value representing said value of said measured data is an average value of said measured data.

3. The method according to claim 1, wherein said modelling values are modelled path loss data and said measured data are path loss data determined using the steps of:

emitting a reference signal by a radio cell of a radio network;

measuring the receiving power of said reference signals at said reference points; and determining the path loss data from said receiving power.

4. The method according to claim 1, wherein said modelling values are modelled impulse responses.

5. The method according to claim 1, wherein at first the following steps are carried out:

obtaining measured data over the entire radio cell;

determining a value representing said values of said measured data;

forming of a value representing said values of said modelling values over said entire radio cell;

forming said difference of said values representing said values of measured data and modelling data; and correcting said modelling values with this difference.

6. The method according to claim 5, wherein said values representing said values of modelling data and measured data are average values.

7. A device for adapting a radio network model to conditions of a real radio network, comprising:

a data base for storing a virtual radio network model with position dependent modelling values;

a measuring arrangement for generation of position dependent measured data of said modelled real radio network at measuring positions; and a data processing arrangement adapted to modify each of said modelling values by setting a fine grid in a radio cell, defining small area portions, wherein at least one of said modelling values is attributed to each area portion by said radio network model, setting a rough grid superimposed on said fine grid thereby defining rough grid regions, each said region of the rough grid comprises a plurality of said fine grid area portions; said data processing arrangement is adapted to modify said modelling values attributed to said fine grid area portions in said different rough grid regions by a mathematical operation, which is directly dependent on said measured data of said respective region and said position of said fine grid area portions.

8. The device according to claim 7, wherein said measuring arrangement responds to said receiving power of reference signals emitted by said radio cells.

9. The device according to claim 8, further comprising a radio cell with a code and said measuring arrangement is adapted to detect said code of said radio cell.

10. The device according to claim 7, wherein said measuring arrangement is a mobile arrangement.

11. The device according to claim 7, wherein said measuring arrangement is an end station of a radio network.

12. The device according to claims 7, wherein said measuring arrangement further comprises means for detecting said respective actual receiving position.

13. The device according to claim 9, further comprising means for recording and output said measured values together with the respective code of said radio cell and the position at the time of the measurement.

14. The method according to claim 1, wherein said step of setting the rough grid by said data processing arrangement, a reference point is set in each said rough grid region.

15. The method according to claim 14, wherein each said reference point is disposed at a centre of the respective rough grid region.

16. The method according to claim 15, further comprising a step of global correction of displacement of modelling values of the entire radio cell, wherein average values of the measures values and average values of the modelling values are formed for the entire radio cell, the modelling values are corrected by difference of the average values, so as to allow for local deviations between the measured values and the modelling values to be corrected.

17. The method according to claim 16 further comprising the step of providing local adaptation of the modelling values to be affected by interpolation, so that average measured data is formed for each said region of the rough grid where the measured data is obtained, the modelling value in each said centrally disposed reference point is set to value dependent on the average value, and the modelling values of other fine grid area portions in the respective rough grid region are corrected with a function decreasing from the reference point with increasing distance from the centre point.

* * * * *